US011556653B1

United States Patent
Han et al.

(10) Patent No.: US 11,556,653 B1
(45) Date of Patent: Jan. 17, 2023

(54) SYSTEMS AND METHODS FOR DETECTING INTER-PERSONAL ATTACK APPLICATIONS

(71) Applicant: NortonLifeLock Inc., Tempe, AZ (US)

(72) Inventors: Yufei Han, Antibes (FR); Kevin Roundy, El Segundo, CA (US); Acar Tamersoy, Culver City, CA (US)

(73) Assignee: Gen Digital Inc., Tempe, AZ (US)

( * ) Notice: Subject to any disclaimer, the term of this patent is extended or adjusted under 35 U.S.C. 154(b) by 312 days.

(21) Appl. No.: 16/909,803

(22) Filed: Jun. 23, 2020

Related U.S. Application Data

(63) Continuation-in-part of application No. 16/286,050, filed on Feb. 26, 2019, now Pat. No. 11,295,015.

(51) Int. Cl.
*G06F 21/57* (2013.01)
*G06F 21/56* (2013.01)

(52) U.S. Cl.
CPC .......... *G06F 21/577* (2013.01); *G06F 21/566* (2013.01)

(58) Field of Classification Search
CPC ...... G06F 21/56; G06F 21/562; G06F 21/564; G06F 21/566; G06F 21/577
See application file for complete search history.

(56) References Cited

U.S. PATENT DOCUMENTS

| | | | |
|---|---|---|---|
| 8,832,840 B2 | 9/2014 | Zhu et al. | |
| 9,178,901 B2 | 11/2015 | Xue et al. | |
| 9,848,010 B2 | 12/2017 | Bolgert et al. | |
| 10,116,680 B1 | 10/2018 | Han et al. | |
| 10,482,250 B1 | 11/2019 | Joshi et al. | |
| 10,715,542 B1 | 7/2020 | Wei et al. | |
| 11,003,774 B2 * | 5/2021 | Saxe | G06N 3/04 |
| 2013/0111592 A1 | 5/2013 | Zhu et al. | |

(Continued)

OTHER PUBLICATIONS

Gensim, "models.lsimodel—Latent Semantic Indexing", URL: https://radimrehurek.com/gensim/models/lsimodel.html, Nov. 1, 2019, pp. 1-8.

(Continued)

*Primary Examiner* — Linglan Edwards
(74) *Attorney, Agent, or Firm* — Greenberg Traurig, LLP

(57) ABSTRACT

The disclosed computer-implemented method for detecting inter-personal attack applications may include (i) receiving application marketplace information describing application feature information, (ii) creating, by performing natural language processing on the feature information, a feature vector identifying a potentially malicious functionality of the application, (iii) creating a profiling vector that is a categorical feature representation of installation information from an application installation file, and (iv) performing a security action including (A) mapping, using a machine learning model, the feature vector and the profiling vector to a multi-dimensional output vector having element corresponding to a malware category and (B) determining a malicious extent of the application by combining the categories identified by the multi-dimensional output vector with bi-partite graph information identifying (I) relations between a plurality of applications and (II) relations between a plurality of computing devices hosting the plurality of applications. Various other methods, systems, and computer-readable media are also disclosed.

19 Claims, 6 Drawing Sheets

(56) References Cited

U.S. PATENT DOCUMENTS

| | | | |
|---|---|---|---|
| 2017/0149815 | A1 | 5/2017 | Bolgert et al. |
| 2018/0176241 | A1 | 6/2018 | Manadhata et al. |
| 2019/0007455 | A1 | 1/2019 | Sheng |
| 2020/0364338 | A1* | 11/2020 | Ducau .................... G06N 3/08 |
| 2022/0164444 | A1* | 5/2022 | Prudkovskij .......... G06F 21/562 |

OTHER PUBLICATIONS

Havron et al., "Clinical Computer Security for Victims of Intimate Partner Violence", URL: https://www.usenix.org/conference/usenixsecurity19/presentation/havron, Proceedings of the 28th USENIX Security Symposium, Aug. 14-16, 2019, 19 pages.

Chatterjee et al., "The Spyware Used in Intimate Partner Violence", URL: http://nixdell.com/papers/spyware.pdf, Security and Privacy, Oakland, May 21, 2018, pp. 1-18.

Freed et al., ""A Stalker's Paradise": How Intimate Partner Abusers Exploit Technology", URL: https://rist.tech.cornell.edu/papers/stalkers-paradise-intimate.pdf, ACM Conference on Human Factors in Computing Systems, Apr. 21-26, 2018, 13 pages.

Roundy et al., "The Many Kinds of Creepware Used for Interpersonal Attacks", IEEE Symposium on Security and Privacy, May 17, 2020, 21 pages.

Letham et al., "15.097:Probabilistic Modeling and Bayesian Analysis", URL: https://ocw.mit.edu/courses/sloan-school-of-management/15-097-prediction-machine-learning-and-statistics-spring-2012/lecture-notes/MIT15_097S12_lec15.pdf, 2012, 42 pages.

Steorts, Rebecca C., "Module 1: Introduction to Bayesian Statistics, Part 1", URL: http://www2.stat.duke.edu/~rcs46/modern_bayes17/lecturesModernBayes17/lecture-1/01-intro-to-Bayes.pdf, 2017, accessed on Feb. 26, 2019, 25 pages.

Tong et al., "Fast Random Walk with Restart and Its Applications", In Sixth International Conference on Data Mining, IEEE, 2006, 10 pages.

Tong et al., "Random walk with restart: fast solutions and applications", Knowledge and Information Systems, vol. 14, No. 3, Springer, 2008, pp. 327-346.

Chau et al., "Polonium: Tera-Scale Graph Mining and Inference for Malware Detection", Proceedings of the SIAM International Conference on Data Mining, Apr. 2011, pp. 131-142.

Yoo et al., "Supervised Belief Propagation: Scalable Supervised Inference on Attributed Networks", IEEE International Conference on Data Mining, Nov. 2017, pp. 595-604.

Bengio et al.; "11 : Label Propagation and Quadratic Criterion", URL: https://www.iro.umontreal.ca/~lisa/pointeurs/bengio_ssl.pdf, 2006, 26 pages.

Zhu et al., "Learning from Labeled and Unlabeled Data with Label Propagation"; URL: http://mlg.eng.cam.ac.uk/zoubin/papers/CMU-CALD-02-107.pdf, Jun. 2002, 19 pages.

* cited by examiner

SYSTEMS AND METHODS FOR DETECTING INTER-PERSONAL ATTACK APPLICATIONS

CROSS REFERENCE TO RELATED APPLICATION

This application is a continuation-in-part of U.S. application Ser. No. 16/286,050 filed on Feb. 26, 2019, the disclosure of which is incorporated herein, in its entirety, by this reference.

BACKGROUND

Inter-personal attack applications provide a way for malicious actors to conduct surveillance and impersonation attacks on unaware targets. In some examples, commonly known as stalkerware, spyware, and creepware, malicious actors may use inter-personal attack applications to engage in harassment, impersonation, surveillance, location tracking, fraud, information theft, concealment, sending text messages, spoofing phone numbers, and creating fake suggestive messages. In many cases, inter-personal attack applications are deployed by non-expert users such as spouses, boyfriends, girlfriends, and relatives. The attacker may have permitted access to a target computing device used by the target. In some examples, the inter-personal attack applications may be applications intended for child online safety and family member locating and thus have a legitimate use, but are also dual-use technology that may be intentionally misused for intimate partner surveillance. Thus, inter-personal attack applications have very substantial capabilities and may be difficult to detect. The present disclosure, therefore, identifies and addresses a need for systems and methods for detecting inter-personal attack applications.

SUMMARY

As will be described in greater detail below, the present disclosure describes various systems and methods for detecting inter-personal attack applications.

In one example, a method for detecting inter-personal attack applications may include (i) receiving, at a computing device and from an application marketplace, feature information describing a feature of an application, (ii) creating, by performing natural language processing on the feature information, a feature vector identifying a potentially malicious functionality of the application, (iii) creating a profiling vector that is a categorical feature representation of installation information from an installation file of the application, and (iv) performing a security action. The security action may include (A) mapping, using a machine learning model, the feature vector and the profiling vector to a multi-dimensional output vector, where each element of the multi-dimensional output vector corresponds to a malware category and (B) determining an extent of maliciousness of the application by combining the categories identified by the multi-dimensional output vector with bi-partite graph information identifying (I) relations between a plurality of applications and (II) relations between a plurality of computing devices hosting the plurality of applications.

In some examples, the feature information may include at least one of a title of the application, a description of the application, and user comment information about the application. In some embodiments, creating the feature vector may include (i) extracting distributional characteristics of key words in the feature information by applying a bag-of-words technique to the feature information, (ii) removing a frequently used word from the feature information to create modified feature information, and (iii) identifying a latent topic of the modified feature information by using latent semantic indexing, wherein the latent topic describes the potentially malicious functionality of the application.

In an example, the method may include (i) calculating a distance between the feature vector of the application and an additional feature vector of an additional application, where the additional application is located at another computing device and has a known degree of maliciousness and (ii) identifying the potentially malicious functionality of the application based on the calculated distance.

In an embodiment, the installation file of the application may be an Android-compatible application package. In some examples, creating the profiling vector may include extracting installation information identifying an application programming interface call that the application is configured to make. In some embodiments, the installation information may include permissions to access at least one of (i) a camera of the computing device, (ii) a microphone of the computing device, (iii) a speaker of the computing device, and/or (iv) information identifying a location of the computing device. In an example, the installation information may include information describing a digital certificate.

In an embodiment, the machine learning model may be a gradient-boosted tree-based multiple-output classifier configured to perform multi-label classification. In some examples, the malware categories may include a surveillance malware category. In some embodiments, the method may include using a belief propagation algorithm to create the bi-partite graph information. In an example, the application may be in the plurality of applications.

In an embodiment, the method may include displaying, on a user display, an indication of the extent of maliciousness of the application. The indication may include (i) information describing the potentially malicious functionality of the application and/or (ii) an indication the application is an inter-personal attack application. In an example, the method may include sending information describing the extent of maliciousness of the application to another computing device.

In one embodiment, a system for detecting inter-personal attack applications may include at least one physical processor and physical memory that includes computer-executable instructions that, when executed by the physical processor, cause the physical processor to (i) receive, at the system and from an application marketplace, feature information describing a feature of an application, (ii) create, by performing natural language processing on the feature information, a feature vector identifying a potentially malicious functionality of the application, (iii) create a profiling vector that is a categorical feature representation of installation information from an installation file of the application, and (iv) perform a security action. The security action may include (A) mapping, using a machine learning model, the feature vector and the profiling vector to a multi-dimensional output vector, where each element of the multi-dimensional output vector corresponds to a malware category and (B) determining an extent of maliciousness of the application by combining the categories identified by the multi-dimensional output vector with bi-partite graph information identifying (I) relations between a plurality of applications and (II) relations between a plurality of computing devices hosting the plurality of applications.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at the computing device and from an application marketplace, feature information describing a feature of an application, (ii) create, by performing natural language processing on the feature information, a feature vector identifying a potentially malicious functionality of the application, (iii) create a profiling vector that is a categorical feature representation of installation information from an installation file of the application, and (iv) perform a security action. The security action may include (A) mapping, using a machine learning model, the feature vector and the profiling vector to a multi-dimensional output vector, where each element of the multi-dimensional output vector corresponds to a malware category and (B) determining an extent of maliciousness of the application by combining the categories identified by the multi-dimensional output vector with bi-partite graph information identifying (I) relations between a plurality of applications and (II) relations between a plurality of computing devices hosting the plurality of applications.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
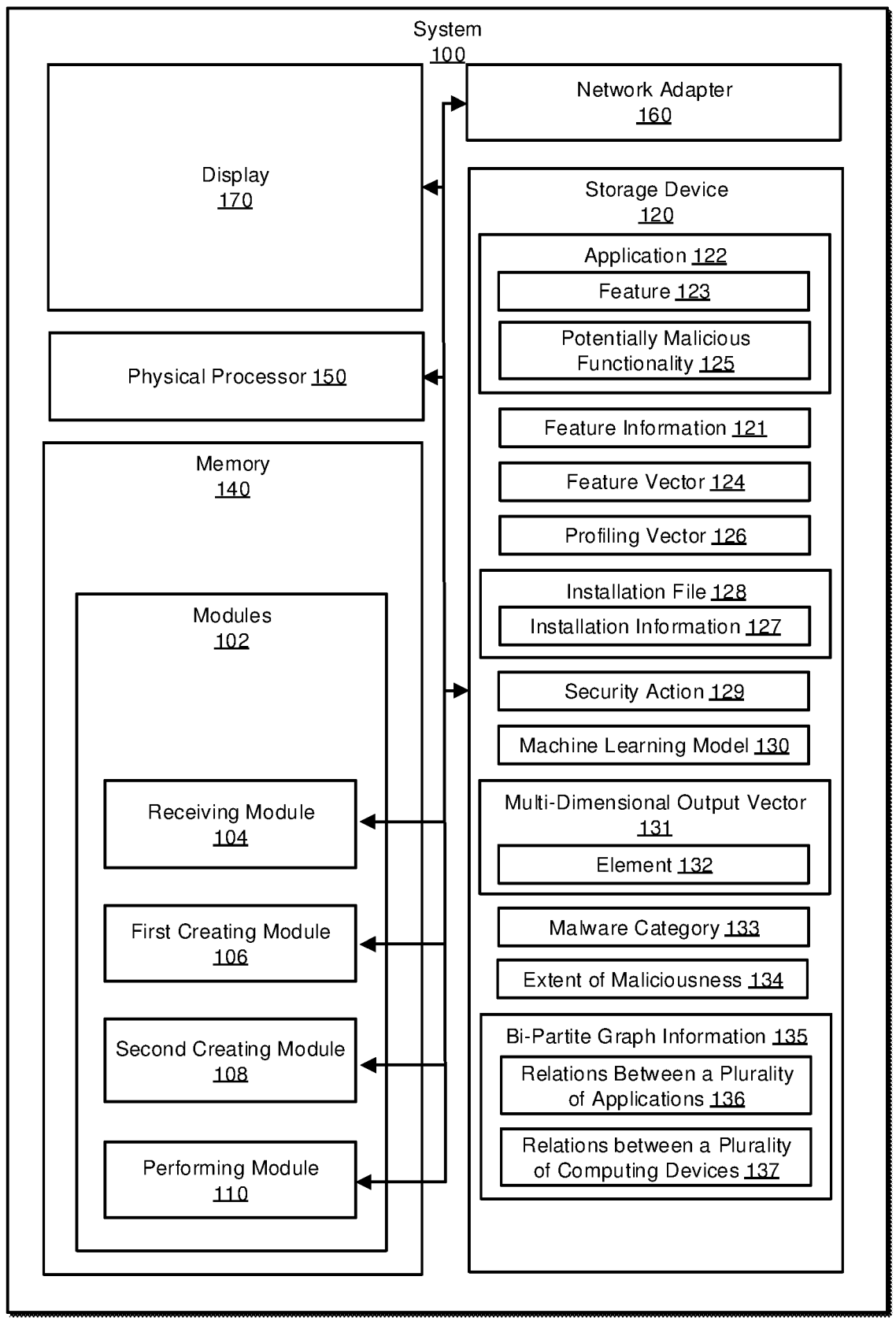
FIG. 1 is a block diagram of an example system for detecting inter-personal attack applications.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting malware. In some examples, the provided systems and methods maybe directed to detecting inter-personal attack applications.

Malware such as inter-personal attack applications may provide malicious users with a broad variety of capabilities such as automated surveillance and abilities to perform impersonation attacks. For example, inter-personal attack applications may be surveillance applications, one-time data dumping applications, and/or impersonation applications. Thus, there is a need to detect these types of malware and to provide authorized users with precise warnings that include a high-level of detail to enable informed reactions on behalf of the authorized users. In some examples, providing precise warnings may alert users who intentionally install the applications but are not completely aware of the abusive potential of the applications.

As will be explained in greater detail herein, some systems and methods described herein may automatically detect presences, probabilities, and/or degrees of maliciousness (i.e., extents of maliciousness) of applications being evaluated by combining categories identified by multi-dimensional output vectors with bi-partite graph information. The bi-partite graph information may identify relations between pluralities of applications and/or relations between pluralities of computing devices hosting the pluralities of applications. In some examples, some systems and methods described herein may automatically combine Natural Language Processing (NLP) of application titles and descriptions with explainable multi-label Machine Learning (ML) techniques to provide nuanced detecting capabilities and to enable directing authorized users to specific portions of application titles and/or application descriptions that indicate ways in which the applications may be used for inter-personal attacks.

In embodiments, the systems and methods described herein may display, on user display devices, the indications of extents of maliciousness of evaluated applications. In examples, the indications may include information describing potentially malicious functionality of evaluated applications such as malware categories (e.g., inter-personal attack applications, stalkerware, spyware, harassment, evasion, spoofing, locating, auto-liking, information extraction, impersonating, etc.). In embodiments, the indications may include indications of user device hardware and/or functionalities the evaluated applications are configured to access and/or are accessing. In embodiments, the indications may indicate the evaluated applications are configured to access user device hardware such as cameras, microphones, headphones, and/or network interfaces. In embodiments, the indications may indicate the evaluated applications are configured to access user device hardware functionalities such as texting, dialing phone numbers, sending data and/or other digital information, receiving data and/or other digital information, locating the user devices, and/or other user device hardware functionalities that may be used for malicious activities. Providing these indications beneficially enables authorized users of the user device hardware to make informed decisions regarding the presence of the evaluated applications. In examples, the authorized uses may decide to remove the evaluated applications or to retain the evaluated applications.

The systems and methods described herein may use a machine learning model configured to detect abusive potentials of applications to create the multi-dimensional output vectors representing different malware categories. The systems and methods described herein may implement explainable machine learning techniques to provide insight into reasons for which applications are characterized in the manner in which the machine learning model characterizes them. In examples, the machine learning models may process inputs including feature vectors identifying potentially malicious functionalities of the applications being evaluated and/or profiling vectors that are categorical feature representations of installation information from installation files of the applications being evaluated. In embodiments, the systems and methods described herein may use natural language processing to create the feature vectors from descriptive features, provided by application marketplaces, of the applications being evaluated. In examples, the systems and methods described herein may create the profiling vectors from installation information such as application programming interface (API) calls, application permissions, and/or digital certificates from installation files of the applications being evaluated.

In some examples, the bi-partite graph information may provide information identifying degrees and/or probabilities of maliciousness of applications being evaluated based on (i) related applications co-installed on specific user devices and/or stored on the specific user devices and/or (ii) relations between pluralities of computing devices hosting the related applications.

By doing so, the systems and methods described herein may improve functioning of computing devices (i.e., user devices), improve cybersecurity protection provided to computing devices, and/or provide targeted protection against malware, and thus improve fields of malware protection in general, by providing a method for automatically increasing cybersecurity protection of computing devices. Examples of the provided techniques may improve a state of security of computing devices, such as mobile phones, computers, tablet computers, and/or mobile computers, potentially resulting in significant time and/or monetary savings. Further, systems and methods described herein may beneficially reduce and/or eliminate gaps in time during which computing devices have reduced degrees of cybersecurity protection, when compared to other techniques. In some examples, the provided systems and methods may improve functioning of protected computing devices by providing increased cybersecurity protection to the protected computing devices. Further, the provided techniques may detect difficult-to-detect suspicious applications, malware, inter-personal attack applications, etc. installed on user devices. In some embodiments, the provided techniques may better-inform authorized users of user devices by providing detailed functionalities of applications, such as suspicious applications, malware, inter-personal attack applications, etc. that are installed on the user devices. In some examples, the provided techniques may better-inform authorized users of user devices by alerting the authorized users of potential risks of personal privacy leakage (e.g., via stalking, surveillance, dictating text messages, and/or dictating phone communications) caused by suspicious applications, malware, inter-personal attack applications, etc. that are installed on the user devices. Thus, disclosed systems and methods may provide protection for common targets of malware.

Figure 2:
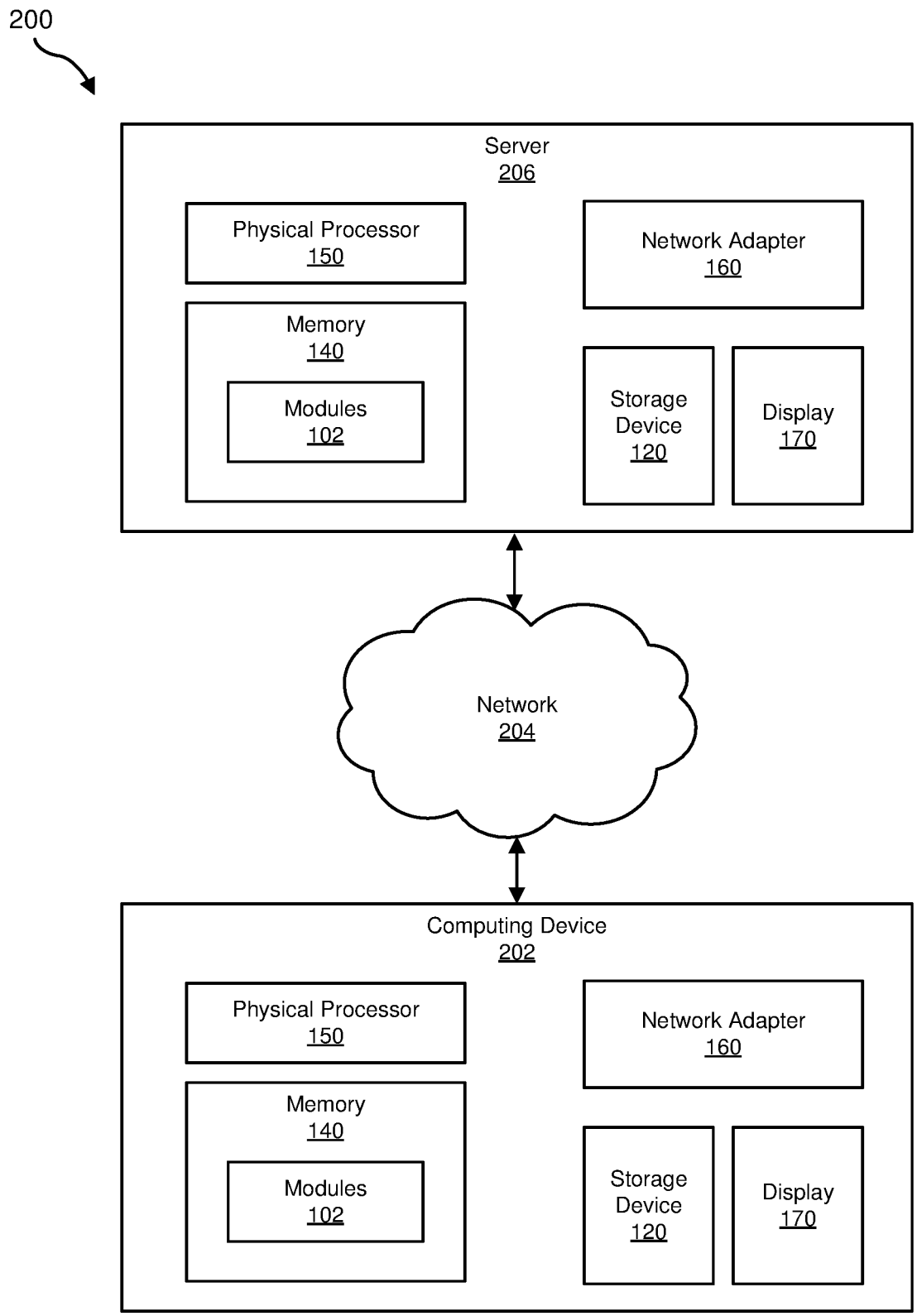
FIG. 2 is a block diagram of an additional example system for detecting inter-personal attack applications.
Figure 3:
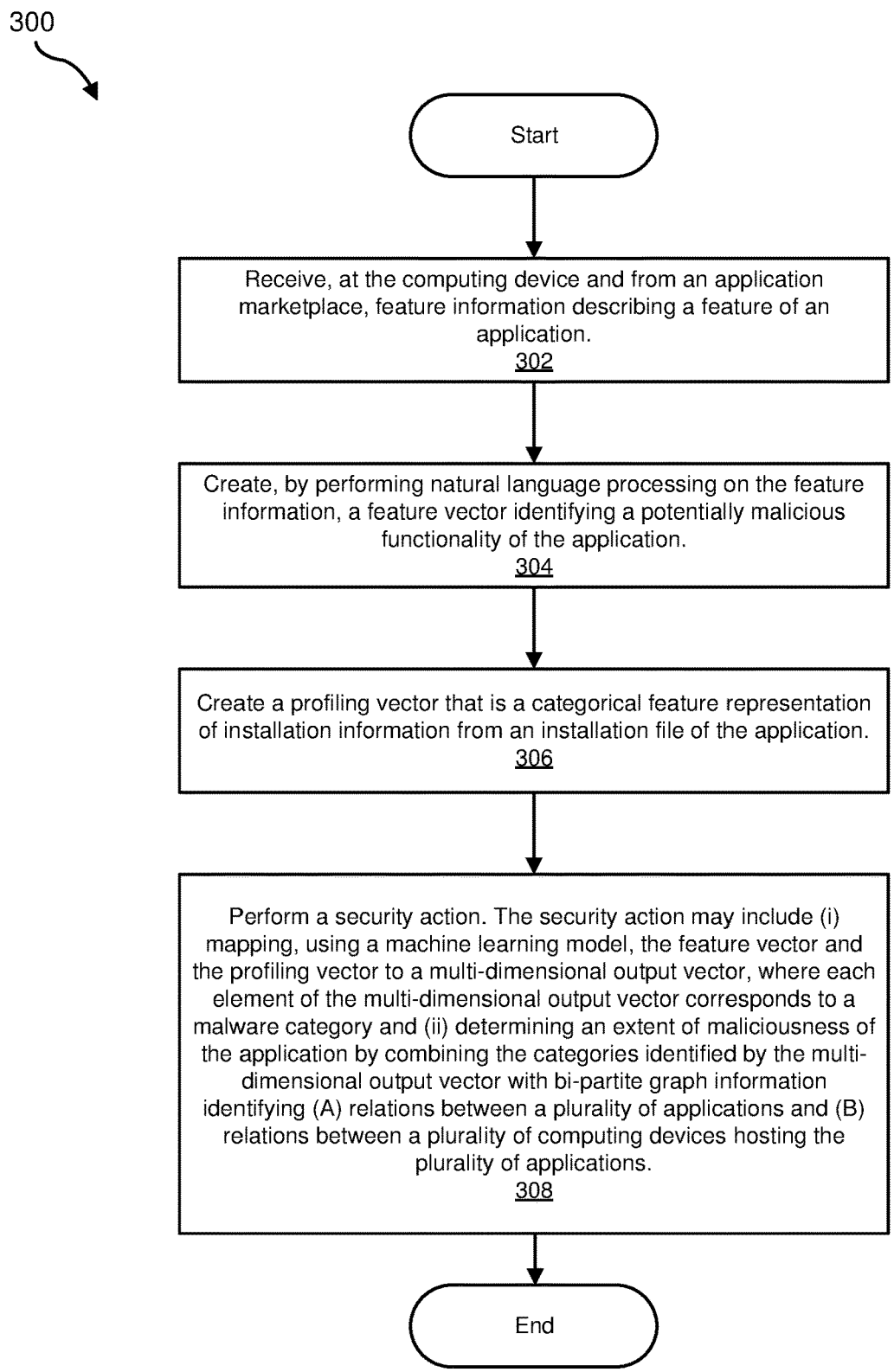
FIG. 3 is a flow diagram of an example method for detecting inter-personal attack applications.
Figure 4:
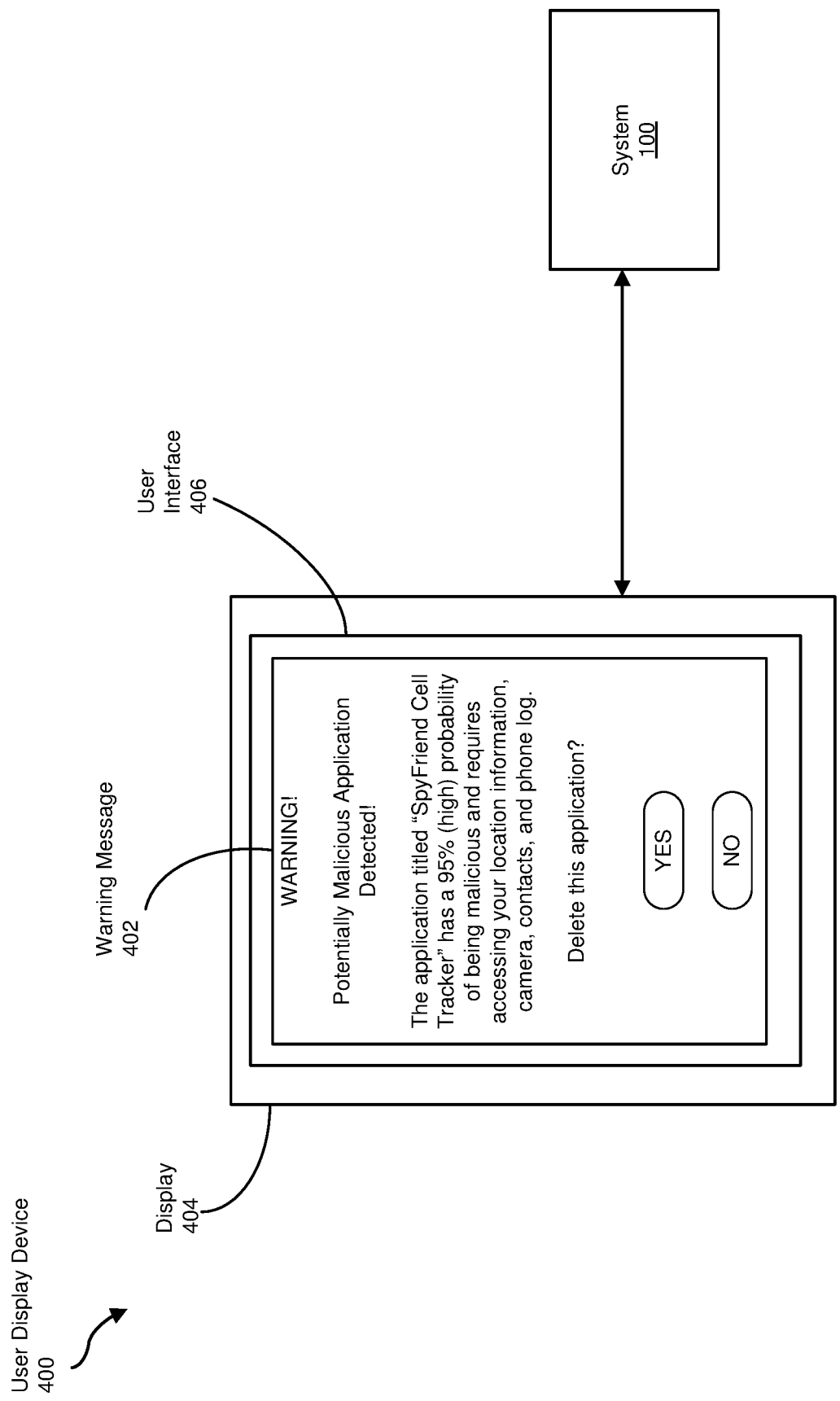
FIG. 4 is a block diagram of an example message displaying an indication of an extent of maliciousness of an application on a user display device.

The following will provide, with reference to FIGS. 1-2 and 4, detailed descriptions of example systems for detecting inter-personal attack applications. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for detecting inter-personal attack applications. As illustrated in this figure, example system 100 may include one or more modules 102 for performing one or more tasks. As will be explained in greater detail below, modules 102 may include a receiving module 104, a first creating module 106, a second creating module 108, and a performing module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of feature information 121, an application 122, a feature 123 of an application (e.g., application 122), a feature vector 124, potentially malicious functionality 125 of an application (e.g., application 122), a profiling vector 126, installation information 127, an installation file 128 of an application (e.g., application 122), a security action 129, a machine learning model 130, a multi-dimensional output vector 131, an element 132 of a multi-dimensional output vector (e.g., multi-dimensional output vector 131), a malware category 133, an extent of maliciousness 134, bi-partite graph information 135, relations between a plurality of applications 136, and/or relations between a plurality of computing devices 137 (e.g., hosting application 122 and/or the plurality of applications).

Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, an attached storage device, variations or combinations of one or more of the same, and/or any other suitable storage memory.

As illustrated in FIG. 1, example system 100 may also include one or more physical processors, such as physical processor 140. Physical processor 140 generally represents any type or form of hardware-implemented processing unit capable of interpreting and/or executing computer-readable instructions. In one example, physical processor 140 may access and/or modify one or more of modules 102 stored in memory 150. Additionally or alternatively, physical processor 140 may execute one or more of modules 102 to facilitate detecting inter-personal attack applications. Examples of physical processor 140 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 150. Memory 150 generally represents any type or form of volatile or non-volatile storage device or medium capable of storing data and/or computer-readable instructions. In one example, memory 150 may store, load, and/or maintain one or more of modules 102. Examples of memory 150 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 160. In some examples, network adapter 160 may be a physical network adapter connected to a physical network (e.g., network 204 in FIG. 2). In some examples, network adapter 160 may use different types of hardware interface technologies.

As illustrated in FIG. 1, example system 100 may also include one or more display devices, such as display 170. Display 170 generally represents any type or form of device capable of visually displaying information (e.g., to a user). In some examples, display 170 may present a graphical user interface. In non-limiting examples, display 170 may present at least a portion of information indicating one or more of feature information 121, application 122, feature 123, feature vector 124, potentially malicious functionality 125, profiling vector 126, installation information 127, installation file 128, security action 129, machine learning model 130, multi-dimensional output vector 131, element 132, malware category 133, extent of maliciousness 134, bi-partite graph information 135, relations between a plurality of applications 136, and/or relations between a plurality of computing devices 137.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect malware (e.g., inter-personal attack applications). For example, and as will be described in greater detail below, one or more of modules 102 may cause computing device 202 and/or server 206 to (i) receive, at a computing device (e.g., example system 100 and/or computing device 202) and from an application marketplace, feature information 121 describing feature 123 of application 122, (ii) create, by performing natural language processing on feature information 121, feature vector 124 identifying potentially malicious functionality 125 of application 122, (iii) create profiling vector 126 that is a categorical feature representation of installation information 127 from installation file 128 of application 122, and (iv) perform security action 129 including (A) mapping, using a machine learning model 130, feature vector 124 and profiling vector 126 to multi-dimensional output vector 131, where each element 132 of multi-dimensional output vector 131 corresponds to malware category 133 and (B) determining extent of maliciousness 134 of application 122 by combining the categories identified by multi-dimensional output vector 131 with bi-partite graph information 135 identifying (I) relations between a plurality of applications 136 and (II) relations between a plurality of computing devices 137 hosting the plurality of applications.

Computing device 202 generally represents any type or form of computing device capable of reading computer-executable instructions. In some examples, computing device 202 may represent a computer running security software, such as cybersecurity software and/or privacy software. In some examples, computing device 202 may represent a computer hosting an application marketplace and/or storing information describing a feature of an application advertised at an application marketplace. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, server 206 may represent a computer running security software, such as cybersecurity software and/or privacy software. In some examples, server 206 may represent a computer hosting an application marketplace and/or storing information describing a feature of an application advertised at an application marketplace. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

FIG. 3 is a flow diagram of an example computer-implemented method 300 for detecting inter-personal attack applications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive, at computing devices and/or from application marketplaces, feature information describing features of applications (e.g., applications to be evaluated). The systems described herein may perform step 302 in a variety of ways. For example, receiving module 104 may, as part of computing device 202 in FIG. 2, receive, at a computing device (e.g., example system 100 and/or computing device 202) and from an application marketplace, feature information 121 describing feature 123 of application 122.

In some embodiments, the provided techniques may include implementing multi-label classifiers that may consume information (e.g., keywords) extracted from application marketplaces and/or from installation files of the applications being evaluated (e.g., an ANDROID Application Package (APK)). The marketplace data may include many natural language features, such as AppID of the application being evaluated (i.e., a string of data including important keywords and information about the developers of the applications), application titles, application descriptions, and/or user comments about the applications. This information may include natural language descriptions that may be highly indicative of the intents and uses of the applications being evaluated. For example, applications that access location information may be used to stalk someone. In some examples, installation files of the applications being evaluated may include information about application capabilities such as permissions (e.g., ANDROID permissions) and application programming interface (API) calls. In examples, the installation files of the applications being evaluated may include file strings of data that may indicate the application capabilities.

Application marketplaces may be websites where applications may be available for a charge or free of charge. Application marketplaces may provide convenient websites for purchasers to browse, select, and/or download applications such as inter-personal attack applications. In some examples, the application marketplaces may purvey harmless applications as well as malware. The applications may be advertised on the application marketplaces with descriptions of features of the applications, title of the applications, capabilities of the applications, and ratings of the applications. In some examples, the feature information may include titles of the applications, descriptions of the applications, and/or user comment information about the applications.

In a non-limiting example, an inter-personal attack application may be titled "Cheating Spouse Tracker" and offer "a complete spouse tracking solution including 24/7 location tracking as well as full access to all text messages, photographs, phone directories, and browser histories." In this example, feature information may include at least a part of the title and/or at least a part of the description of the application. In this example, feature information may include user ratings (e.g., "4.5 of 5 stars!") and/or user comments about the application (e.g., "I caught my spouse taking compromising photos with another person in less than 24 hours after installing this program").

In some embodiments, the example computer-implemented method 300 for detecting inter-personal attack applications may include requesting feature information describing features of applications from application marketplaces.

The term "feature information," as used herein, generally refers to information describing aspects of applications. Examples of feature information include, without limitation, titles of applications, potentially malicious functions performed by the applications, and/or user device hardware that the applications may be configured to access. Non-limiting examples of user device hardware that the applications may be configured to access may include physical memory, physical processors, information storage devices, locating devices, network adapters (e.g., WiFi, cellular, and/or Bluetooth), cameras, microphones, speakers, displays, and/or other hardware devices coupled (e.g., wirelessly and/or via wired connection) to the user device hardware.

As illustrated in FIG. 3, at step 304 one or more of the systems described herein may create, by performing natural language processing (NLP) on the feature information, feature vectors identifying potentially malicious functionalities of the applications. In examples, the feature vectors may have low-dimensional feature variances. The systems described herein may perform step 304 in a variety of ways. For example, first creating module 106 may, as part of computing device 202 in FIG. 2, create, by performing natural language processing on feature information 121, feature vector 124 identifying potentially malicious functionality 125 of application 122.

In some examples, creating the feature vector may include extracting distributional characteristics of key words in the feature information by applying bag-of-words techniques to the feature information. In an example, the Bag-of-Words techniques parse raw text feature sets of applications to extract distributional characteristics of key words collected from the raw texts. In some embodiments, creating the feature vectors may include removing the most frequent words in feature extraction, as the most frequently used words are commonly used over different applications and thus irrelevant during the classifying process. In some examples, creating the feature vectors may include using Latent Semantic Indexing (LSI) to identify latent topics existing in the raw texts (e.g., marketplace information) of the applications. Each latent topic may cover a group of key words of the raw applications description texts sharing similar co-occurrence statistics. These latent topics may be used as indicators of specific surveillance functionalities introduced in the applications. The raw texts of each application may then be projected to low-dimensional semantic embedding spaces. LSI may map the raw texts of applications as linear combinations of the latent topics.

In some embodiments, creating the feature vectors may include using one-hot encoding schemes to generate categorical feature representations of application permissions. Each application may possess multiple application permissions (e.g., permission 1, permission 2, permission 3 . . . , permission k). If a total number of application permissions in the training application samples is T, a T-dimensional binary code vector may be used for each application. Each binary code (code i=0/1) may indicate whether the application possesses permission "I". Application permissions may be used as categorical variables that describe how applications function and thus may be used as additional features to create profiling vectors. A non-limiting example of a permission is: com.google.android.c2dm.permission.RECEIVE.

In some embodiments, creating the feature vectors may include removing frequently used words from the feature information to create modified feature information.

In an example, creating the feature vectors may include identifying latent topics of the modified feature information by using latent semantic indexing, wherein the latent topics describe the potentially malicious functionalities of the applications.

In an example, the method may include calculating distances between feature vectors of applications and additional feature vectors of additional applications. Computed distances may indicate similarity between applications (e.g., if applications use location information, then these applications have, to some extent, related functionalities). In some embodiments, the additional applications may be located at other computing devices. In some embodiments, the additional applications may have known degrees of maliciousness. In another embodiment, the method may include identifying the potentially malicious functionalities of the applications based on the calculated distances.

As illustrated in FIG. 3, at step 306 one or more of the systems described herein may create profiling vectors that are categorical feature representations of installation information from installation files of the applications. The systems described herein may perform step 306 in a variety of ways. For example, second creating module 108 may, as part of computing device 202 in FIG. 2, create profiling vector 126 that is a categorical feature representation of installation information 127 from installation file 128 of application 122.

In some examples, multi-label classifiers may be used to create profiling vectors that are categorical feature representations of installation information. In some embodiments, classes detected by multi-label classifiers may be focused on particular types of privacy leaks and attacks deployed by inter-personal attack apps, as well as properties of the applications that make the applications dangerous (e.g., the applications are covert and/or are able to hide themselves and other applications from view). The provided techniques may detect multiple classes at the same time (hence the names "multi-label classifiers" and "multi-label classification process"), as many applications may perform several surveillance tasks simultaneously.

In an embodiment, the installation files of the applications may be Android-compatible application packages (i.e., a file having an Android Package Kit (APK) format). In an embodiment, the installation files of the applications may include information such as permissions, file attributes, signatures (e.g., third party certificates), and/or duration information.

In some examples, creating the profiling vectors may include extracting installation information identifying application programming interface calls that the applications are configured to make.

In some embodiments, the installation information may include permissions to access at least one of (i) cameras of the computing devices, (ii) microphones of the computing devices, (iii) speakers of the computing devices, and/or (iv) information identifying locations of the computing devices.

In an example, the installation information may include information describing digital certificates.

As illustrated in FIG. 3, at step 308 one or more of the systems described herein may perform security actions. The systems described herein may perform step 308 in a variety of ways. For example, performing module 110 may, as part of computing device 202 in FIG. 2, perform security action 129. In some examples, performing module 110 may, as part of computing device 202 in FIG. 2, (A) map, using a machine learning model 130, feature vector 124 and profiling vector 126 to multi-dimensional output vector 131, where each element 132 of multi-dimensional output vector 131 corresponds to malware category 133 and (B) determine extent of maliciousness 134 of application 122 by combining the categories identified by multi-dimensional output vector 131 with bi-partite graph information 135.

In an embodiment, the machine learning models may be gradient-boosted tree-based multiple-output classifiers (e.g., a multi-label classification models) configured to perform multi-label classification. Implementing tree-structured classifiers may help to explain how application features are combined to achieve detection and/or classification. Both text-based and permission-based features may be used as input to the gradient-boosted tree based multiple-output classifiers. Inside the classifiers, multiple levels of tree-structured classifiers may be cascaded into staged inference models. The cascade structures may allow the classifiers to conduct coarse-to-fine classification of the input attributes of the applications. The multi-label classification models may map input attributes to multi-dimensional output vectors. Each element of the output vectors may correspond to one of the application categories. Thus, the machine learning models may classify both numerical and categorical features of applications via tree-based structures.

In some examples, the malware categories (i.e., classes) may include categories such as a surveillance malware category, an attack application category, and/or an inter-personal attack application category. In some examples, the malware categories may include surveillance, recording, location tracking, and/or telephone call dictating.

In some circumstances, feature information describing application installation information and/or marketplace descriptions of applications being evaluated may not be available or may be limited in quantity. To address these circumstances, in some embodiments, extents of maliciousness may be inferred at least in part by relations associated with the applications being evaluated. In some examples, extents of maliciousness may be inferred at least in part by (i) analyzing software having both known degree(s) of maliciousness and that are often found installed on devices along with the applications being evaluated (i.e., relations between a plurality of applications 136) and/or (ii) analyzing a presence of computing devices hosting the applications being evaluated (e.g., relations between a plurality of computing devices 137). In an example, bi-partite graph information 135 may identify (I) relations between a plurality of applications 136 and (II) relations between a plurality of computing devices 137 hosting the plurality of applications.

In some embodiments, the method may include using belief propagation algorithms to create the bi-partite graph information used to identify the extents of maliciousness of applications being evaluated. In some examples, the provided systems and methods may evaluate (e.g., classify) applications by using structure information of the bi-partite graphs that encode relations between applications and devices hosting the applications. For example, if two applications tend to be hosted and/or installed by the same device, these two applications tend to share similar categories. This structural information can provide extra evidence for categorizing applications.

In some embodiments, bi-partite graph information may include records of hosting devices indicating which applications are hosted on respective devices. In some embodiments, bi-partite graph information may include large numbers of nodes, where each node represents a user device and/or an application installed on a user device. In some examples, bi-partite graph information may include information describing relations between hosting devices and applications installed thereon and/or relations between applications and hosting devices that share the applications.

In circumstances where feature information describing application installation information and/or marketplace descriptions of an application being evaluated may not be available or may be limited in quantity, at least one of three cases may arise: (i) no application installation information and/or marketplace descriptions are available for the applications being evaluated, (ii) a limited quantity of application installation information and/or marketplace descriptions are available for the applications being evaluated, or (iii) a large quantity of application installation information and/or marketplace descriptions are available for the applications being evaluated.

In some examples, bi-partite graph information may be used to classify applications being evaluated, where no application installation information or marketplace descriptions are available for the applications being evaluated. The applications being evaluated may be categorized by applying vectors on specific features of other applications that are available on nodes on which the applications being evaluated are installed. The nodes may be labeled, and a belief propagated about the applications being evaluated through the relations between the nodes. For example, given two applications, one with known features and one with unknown features, the provided systems and methods may classify the application having known features. Subsequently, when both applications frequently appear on the same type of device, then it is likely the two applications should have the same classification label and thus share the same maliciousness description (e.g., degree of maliciousness). Thus, the provided systems and methods may identify and/or propagate classification information using the bi-partite graph information.

In some examples, bi-partite graph information may be used to classify applications being evaluated, where a limited quantity of application installation information and/or marketplace descriptions is available for the applications being evaluated. The applications being evaluated may be categorized by the machine learning models to produce a lower-confidence classification. The provided systems and methods may also identify and/or propagate classification information using the bi-partite graph information. The results of each classification process may be combined to produce higher-confidence classification results.

In some embodiments, bi-partite graph information may be used to classify applications being evaluated, where a large quantity of application installation information and/or marketplace descriptions is available for the applications being evaluated. The applications being evaluated may be categorized by the machine learning models to produce higher-confidence classifications. In some examples, the provided systems and methods may also identify and/or propagate classification information using the bi-partite graph information. In some examples, the results of the machine learning model classification process may be used to update classification information (e.g., types of maliciousness, degrees of maliciousness, and classification confidences) in the bi-partite graph information. In some examples, the results of each classification process may be combined to produce higher-confidence classification results.

In some non-limiting examples, bi-partite graph information may be used to classify a candidate node being evaluated. In an example, if another node other than the candidate node is classified with a high degree of confidence (e.g., >0.9) of being malicious and shares the same device nodes, then the candidate node should thus share the same maliciousness description.

In an example, the application may be in the plurality of applications.

In some examples, security action 129 may include blocking access to devices (e.g., storage devices, memories, network devices, etc.), allowing limited access to devices, allowing read-only access to devices, encrypting information, and/or other acts limiting access to devices. In some examples, security action 129 may be performed automatically. In some embodiments, security action 129 may attempt to identify and/or ameliorate potential security risks. In some examples, security action 129 may include blocking access to and/or by executing processes. In additional examples, security action 129 may include displaying, on user displays, warnings indicating that processes (e.g., applications) may be potentially dangerous and/or an extent to which the processes (e.g., applications) may be potentially dangerous.

In an embodiment, the method may include displaying, on user displays, indications of the extents of maliciousness of the applications (i.e., explanations of detections). The indications of the extents of maliciousness of the applications may include nuanced information. For example, the indications of the extents of maliciousness of the applications may include descriptions of how the applications may violate users' privacy. The indications may include (i) information describing the potentially malicious functionality of the applications and/or (ii) indications the applications are interpersonal attack applications. In an example, the indication may describe that the application being evaluated may access text logs, call logs, cameras, social media, location information, internet usage, microphones, and/or contact lists. In an example, the indication of the extent of maliciousness of the application may provide tailored warnings to users describing specific types of privacy violations that the application may perform. In some examples, the indications of the extent of maliciousness of the applications may include the titles of the applications. In some examples, the indications of the extent of maliciousness of the applications may request user authorization to proceed with downloading and/or using the applications.

In an example, the provided systems and methods may include sending information describing the extents of maliciousness of the applications to other computing devices.

Detection explanations may be nuanced in that the detection explanations may pertain to individual privacy leaks or attacks performed by the applications, each of which may correspond to at least one detection class. To also explain these detections, the provided systems and methods may combine techniques from explainable machine learning with interpretable features used by the classifiers and use these features in explanations of the detections. Doing so may provide more insight and enable users to determine how concerned the users should be about the detections and the intents of the applications. In some examples, the detection explanations may display information indicating a type of privacy attack (e.g., harassment, impersonation, surveillance, location tracking, fraud, information theft, concealment, sending text messages, spoofing phone numbers, and/or creating fake suggestive messages).

To determine which interpretable features had an impact on the decisions of the classifier, the provided systems and methods may make use of application permissions, invoked API's, and/or text-based features constructed from the texts of AppIDs, titles of applications, the descriptions of applications' functionalities, and user comments. The provided classifiers may transform these API calls, application permissions, and/or invoked API's into a simple bag-of-words representation that Is understandable by humans. These features may then be used in tree structures that may further 1) evaluate an importance of each application attribute (e.g., which key words of application description texts and/or which permissions are useful for application classification) and 2) unveil how the application categorization is achieved with the input application attributes.

Upon identifying features that are most influential in the classifications of the applications, the provided systems and methods may present, on display devices, text-based features in the context of sentences to which the text-based features pertain, with the influential words in the sentences highlighted to explain their importance. In some examples, the provided systems and methods may sound audible alerts indicating a presence and/or a degree of maliciousness of applications being evaluated.

We now turn to FIG. 4.

FIG. 4 is a block diagram of an example message displaying an indication of an extent of maliciousness of an application on a user display device. FIG. 4 depicts a non-limiting example of a user display device 400 including display 404 (e.g., display 160) which may present user interface 406. In this example, user display device 400 may display cybersecurity-related message 402. In some examples, cybersecurity-related message 402 may include warning messages indicating detection of web content manipulation, messages instructing users to switch to virtual private networks, messages instructing users to disconnect from Wi-Fi networks, messages instructing users to disconnect from Bluetooth devices, and/or messages instructing users to disconnect from cellular networks. In some examples, user display device 400 may be integrated with system 100 in the same device, such as a mobile device.

We now return to FIG. 3.

As detailed above, the steps outlined in method 300 in FIG. 3 may enable computing devices to increase cybersecurity protection. In some examples the systems described herein may enable automatically detecting malware such as inter-personal attack applications. In some examples, the provided methods may detect extents of maliciousness of malware and display indications of the extents of maliciousness of malware on user display devices. In some examples, the systems and methods described herein may thus improve functioning of computing devices, improve cybersecurity protection provided to computing devices, and/or provide targeted protection against malware, and thus improve fields of malware protection in general, by providing systems and methods for automatically increasing cybersecurity protection of computing devices.

In some examples, the provided methods may be performed by computing devices configured to run operating systems such as ANDROID, LINUX, JUNOS, MICROSOFT WINDOWS, WINDOWS MOBILE, MAC OS, APPLE'S iOS, UNIX, GOOGLE CHROME OS, GOOGLE'S ANDROID, SOLARIS, variations of one or more of the same, and/or any other suitable operating system.

Figure 5:
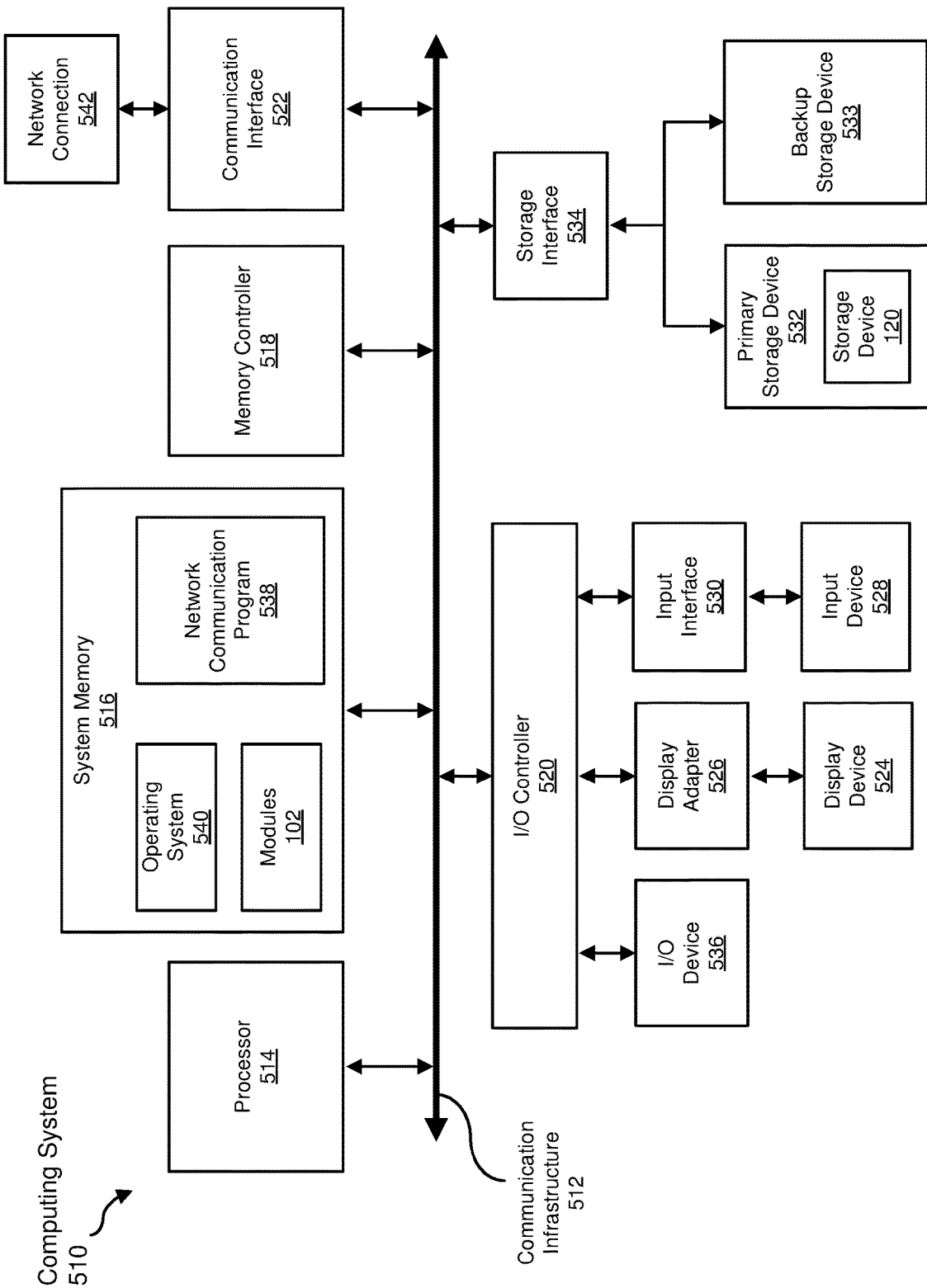
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
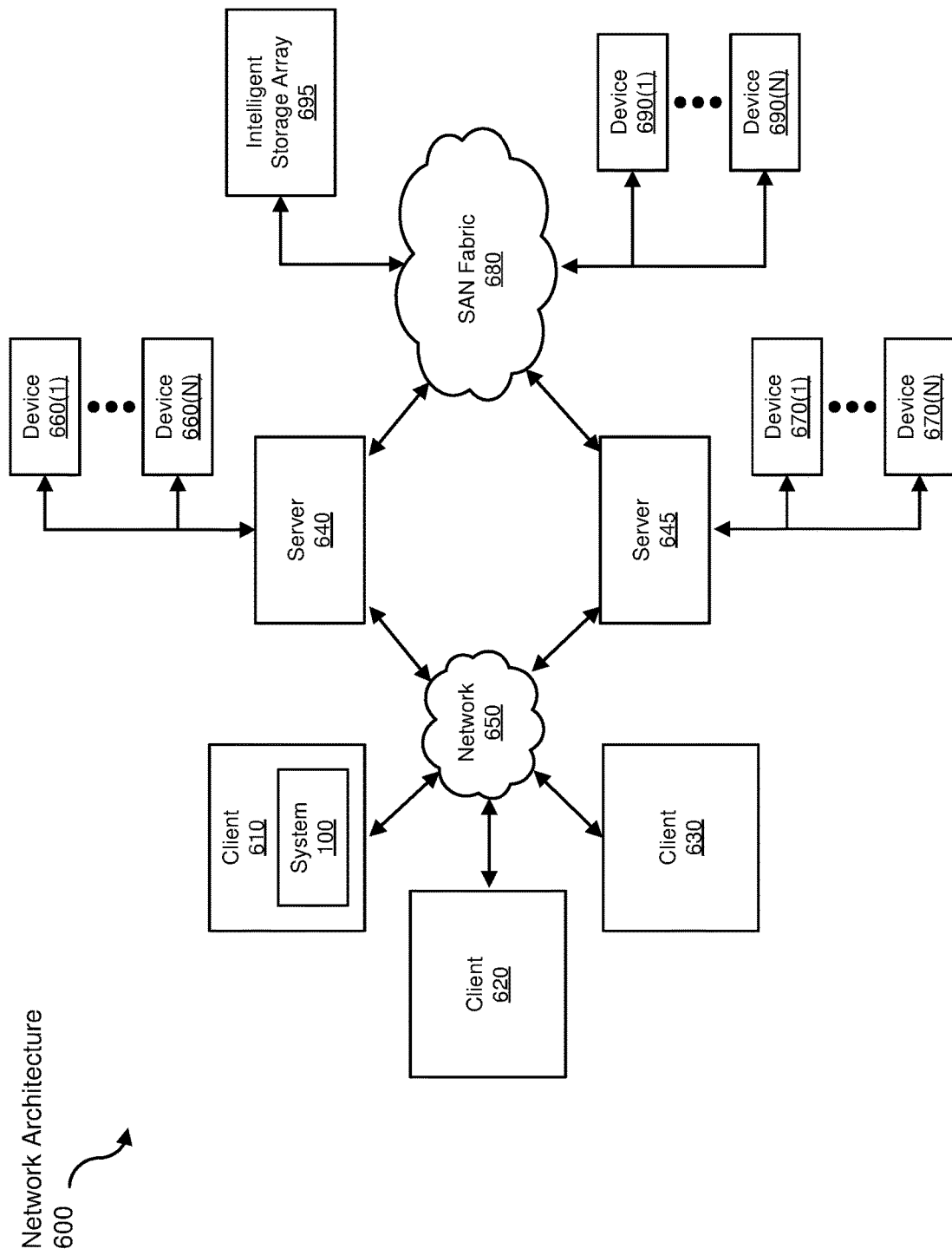
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting inter-personal attack applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive feature information describing a feature of an application to be transformed, transform the feature information describing a feature of an application, output a result of the transformation to a user display device, use the result of the transformation to initiate performing a security action, and store the result of the transformation to a physical memory device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure. In some examples, the singular portends the plural, where practical.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting inter-personal attack applications, at least a portion of the method being performed by a computing device comprising at least one processor, the method comprising:
   receiving, at the computing device and from an application marketplace, feature information describing a feature of an application;
   creating, by performing natural language processing on the feature information, a feature vector identifying a potentially malicious functionality of the application;
   creating a profiling vector that is a categorical feature representation of installation information from an installation file of the application; and
   performing a security action comprising:
      mapping, using a machine learning model, the feature vector and the profiling vector to a multi-dimensional output vector, wherein each element of the multi-dimensional output vector corresponds to a malware category; and
      determining an extent of maliciousness of the application by combining the categories identified by the multi-dimensional output vector with bi-partite graph information identifying:
         relations between a plurality of applications; and
         relations between a plurality of computing devices hosting the plurality of applications.

2. The computer-implemented method of claim 1, wherein the feature information comprises at least one of a title of the application, a description of the application, and user comment information about the application.

3. The computer-implemented method of claim 1, wherein creating the feature vector comprises:
   extracting distributional characteristics of key words in the feature information by applying a bag-of-words technique to the feature information;
   removing a frequently used word from the feature information to create modified feature information; and
   identifying a latent topic of the modified feature information by using latent semantic indexing, wherein the latent topic describes the potentially malicious functionality of the application.

4. The computer-implemented method of claim 1, further comprising:
   calculating a distance between the feature vector of the application and an additional feature vector of an additional application, wherein the additional application is located at another computing device and has a known degree of maliciousness; and
   identifying the potentially malicious functionality of the application based on the calculated distance.

5. The computer-implemented method of claim 1, wherein creating the profiling vector comprises extracting installation information identifying an application programming interface call that the application is configured to make.

6. The computer-implemented method of claim 1, wherein the installation information comprises permissions to access at least one of:
   a camera of the computing device;
   a microphone of the computing device;
   a speaker of the computing device; and
   information identifying a location of the computing device.

7. The computer-implemented method of claim 1, wherein the installation information comprises information describing a digital certificate.

8. The computer-implemented method of claim 1, wherein the machine learning model is a gradient-boosted tree-based multiple-output classifier configured to perform multi-label classification.

9. The computer-implemented method of claim 1, wherein the malware categories comprise a surveillance malware category.

10. The computer-implemented method of claim 1, further comprising using a belief propagation algorithm to create the bi-partite graph information.

11. The computer-implemented method of claim 1, wherein the application is in the plurality of applications.

12. The computer-implemented method of claim 1, further comprising displaying, on a user display, an indication of the extent of maliciousness of the application that comprises:
   information describing the potentially malicious functionality of the application; and
   an indication the application is an inter-personal attack application.

13. The computer-implemented method of claim 1, further comprising sending information describing the extent of maliciousness of the application to another computing device.

14. A system for detecting inter-personal attack applications, the system comprising:
   a physical processor; and
   a physical memory comprising computer-executable instructions that, when executed by the physical processor, cause the physical processor to:
      receive, at the system and from an application marketplace, feature information describing a feature of an application;
      create, by performing natural language processing on the feature information, a feature vector identifying a potentially malicious functionality of the application;
      create a profiling vector that is a categorical feature representation of installation information from an installation file of the application; and
      perform a security action comprising:
         mapping, using a machine learning model, the feature vector and the profiling vector to a multi-dimensional output vector, wherein each element of the multi-dimensional output vector corresponds to a malware category; and
         determining an extent of maliciousness of the application by combining the categories identified by the multi-dimensional output vector with bi-partite graph information identifying:
            relations between a plurality of applications; and
            relations between a plurality of computing devices hosting the plurality of applications.

15. The system of claim 14, wherein the machine learning model is a gradient-boosted tree-based multiple-output classifier configured to perform multi-label classification.

16. The system of claim 14, wherein the computer-executable instructions, when executed by the at last one physical processor, cause the at least one physical processor to display, on a user display, an indication of the extent of maliciousness of the application that comprises:
   information describing the potentially malicious functionality of the application; and an indication the application is an inter-personal attack application.

17. A non-transitory computer-readable medium comprising one or more computer-executable instructions that, when executed by at least one processor of a computing device, cause the computing device to:
- receive, at the computing device and from an application marketplace, feature information describing a feature of an application;
- create, by performing natural language processing on the feature information, a feature vector identifying a potentially malicious functionality of the application;
- create a profiling vector that is a categorical feature representation of installation information from an installation file of the application; and
- perform a security action comprising:
  - mapping, using a machine learning model, the feature vector and the profiling vector to a multi-dimensional output vector, wherein each element of the multi-dimensional output vector corresponds to a malware category; and
  - determining an extent of maliciousness of the application by combining the categories identified by the multi-dimensional output vector with bi-partite graph information identifying:
    - relations between a plurality of applications; and
    - relations between a plurality of computing devices hosting the plurality of applications.

18. The non-transitory computer-readable medium of claim 17, wherein the machine learning model is a gradient-boosted tree-based multiple-output classifier configured to perform multi-label classification.

19. The non-transitory computer-readable medium of claim 17, further comprising computer-executable instructions that, when executed by the at least one processor, cause the computing device to display, on a user display, an indication of the extent of maliciousness of the application that comprises:
- information describing the potentially malicious functionality of the application; and
- an indication the application is an inter-personal attack application.

* * * * *

UNITED STATES PATENT AND TRADEMARK OFFICE
CERTIFICATE OF CORRECTION

PATENT NO. : 11,556,653 B1
APPLICATION NO. : 16/909803
DATED : January 17, 2023
INVENTOR(S) : Yufei Han et al.

It is certified that error appears in the above-identified patent and that said Letters Patent is hereby corrected as shown below:

In the Claims

In Column 24, Claim 16, Line 62, after "the" delete "at last one".

Signed and Sealed this
Thirteenth Day of June, 2023

Katherine Kelly Vidal
*Director of the United States Patent and Trademark Office*